United States Patent
Akiba et al.

(10) Patent No.: US 6,292,439 B1
(45) Date of Patent: Sep. 18, 2001

(54) WATCH

(75) Inventors: Yuichi Akiba; Masafumi Ide, both of Tokorozawa; Takashi Akiyama; Kanetaka Sekiguchi, both of Sayama; Masami Kikuchi, Kodaira; Koji Nakagawa, Hachioji, all of (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/269,596

(22) PCT Filed: Jul. 30, 1998

(86) PCT No.: PCT/JP98/03410

§ 371 Date: Mar. 26, 1999

§ 102(e) Date: Mar. 26, 1999

(87) PCT Pub. No.: WO99/06879

PCT Pub. Date: Feb. 11, 1999

(30) Foreign Application Priority Data

Jul. 30, 1997 (JP) .................................................. 9-204415

(51) Int. Cl.$^7$ ........................... G04B 17/00; C09K 19/00; G02F 1/1335

(52) U.S. Cl. ........................ 368/84; 368/234; 368/242; 368/82; 349/96; 349/106

(58) Field of Search ............................. 368/84, 242, 82, 368/239; 349/96, 98, 105, 106

(56) References Cited

U.S. PATENT DOCUMENTS

| | | | |
|---|---|---|---|
| 3,840,695 | * | 10/1974 | Fischer .................................. 349/106 |
| 5,686,979 | * | 11/1997 | Weber et al. .......................... 349/96 |
| 5,729,313 | * | 3/1998 | Mitsui .................................. 349/106 |
| 5,818,554 | * | 10/1998 | Hiyama et al. ...................... 349/106 |
| 5,888,679 | * | 3/1999 | Suzuki et al. ........................ 349/106 |
| 5,920,367 | * | 7/1999 | Kajimoto et al. ..................... 349/96 |
| 6,067,136 | * | 5/2000 | Yamaguchi et al. ................. 349/106 |
| 6,075,582 | * | 6/2000 | Onnagawa et al. ................... 349/96 |

FOREIGN PATENT DOCUMENTS

| | | |
|---|---|---|
| 0606939A1 | 7/1994 | (EP) . |
| 0877282A2 | 11/1998 | (EP) . |
| 0884622A2 | 12/1998 | (EP) . |
| 54-153066 | 12/1979 | (JP) . |
| 6-230362 | 8/1994 | (JP) . |
| 10-003078 | 1/1998 | (JP) . |
| 10-115828 | 5/1998 | (JP) . |

OTHER PUBLICATIONS

European Search Report dated Nov. 10, 1999.

* cited by examiner

Primary Examiner—Vit Miska
Assistant Examiner—Jeanne-Marguerite Goodwin
(74) Attorney, Agent, or Firm—Armstrong, Westerman, Hattori, McLeland & Naughton, LLP

(57) ABSTRACT

A timepiece is provided with a liquid crystal display panel (10) capable of displaying at least either of time information and calendar information, and comprising a liquid crystal cell having a liquid crystal layer sealed in between a pair of transparent substrates, having an electrode on each of the inner surfaces thereof, facing each other, an absorption-type polarizing film disposed on the visible side of the liquid crystal cell, for absorbing the light linearly polarized in the direction orthogonal to the transmission axis thereof, a reflection-type polarizing film disposed on the side of the liquid crystal cell opposite from the visible side thereof for reflecting the light linearly polarized in the direction orthogonal to the transmission axis thereof, and a color filter disposed on the visible side of the absorption-type polarizing film, or between the absorption-type polarizing film and the reflection-type polarizing film.

20 Claims, 10 Drawing Sheets

WATCH

TECHNICAL FIELD

The invention relates to a timepiece (watch and clock) for displaying at least time information such as hour, minute, and second, or calendar information such as date, days of the week, month, and year by use of a liquid crystal display panel. The time piece includes not only a timepiece for indicating digital display of time information and calendar information but also a combination timepiece capable of indicating digital display and analog display of time information by hands, and an analog timepiece for displaying time scales and so forth on the dial thereof utilizing a liquid crystal display panel, or for indicating simulated hands for an hour hand, a minute hand, and a second hand.

BACKGROUND TECHNOLOGY

A timepiece for indicating digital display of time information such as hour, minute, and second, and calendar information such as date, days of the week, month, and year, by use of a liquid crystal display panel, has been in widespread use for wrist watches and clocks, provided with a crystal oscillation circuit.

There has also been in use a combination timepiece wherein an analog display indicating time information by the hands of the watch is used in combination with digital display indicating time information and calendar information in numbers and letters.

Further, there has been proposed an analog watch for selectively displaying markers in various patterns, or for displaying simulated hands for an hour hand, a minute hand, and a second hand, by making up the dial thereof based on a liquid crystal display panel (refer to, for example, Japanese Patent Laid-open S 54-153066).

In a conventional liquid crystal display panel for displaying time information and calendar information, as in a watch or clock, a liquid crystal cell filled with liquid crystals is sandwiched between two transparent substrates each having an electrode on an inner facing surface thereof, and an upper polarizing film and a lower polarizing film are disposed, respectively, on the external opposite surface of each transparent substrate. If an electric field is applied to the liquid crystals by applying a voltage to the pair of electrodes on the transparent substrates holding the liquid crystal cell therebetween, the optical property of the liquid crystals is changed, thereby locally controlling transmission and absorption of light falling on the liquid crystal display panel such that a predetermined display is effected.

Each of the upper polarizing film and the lower polarizing film is a polarizing film absorbing the light linearly polarized in the direction orthogonal to the transmission axis thereof.

In the case of a watch using the conventional liquid crystal display panel described above, time information and calendar information are displayed in dark against a white background in the normally white mode that is common.

However, by simply displaying time information and calendar information in dark against the white background as described in the foregoing, neither variation in design nor fun of use can be offered, leading to rapid decline in product popularity among consumers. Probably as a result, consumption of digital watches has recently been on the decline, and neither combination timepieces nor analog watches with liquid crystal display panels have received market acceptance.

The invention has been developed in light of the present situation as described, and an object thereof is to provide a timepiece (watch or clock) capable of providing variation in design while indicating digital display or analog display by use of a liquid crystal display panel.

DISCLOSURE OF THE INVENTION

To this end, the invention provides a timepiece provided with a liquid crystal display panel, capable of displaying at least time information or calendar information, and the liquid crystal display panel is made up as follows.

An absorption-type polarizing film for absorbing the light linearly polarized in the direction orthogonal to the transmission axis thereof is disposed on the visible side of the liquid crystal cell, having a liquid crystal layer sealed in between a pair of transparent substrates, each having an electrode on the inner facing surfaces thereof, while a reflection-type polarizing film for reflecting the light linearly polarized in the direction orthogonal to the transmission axis thereof is disposed on the side of the liquid crystal cell opposite from the visible side thereof.

Further, a color filter is disposed on the visible side of the absorption-type polarizing film, or between the absorption-type polarizing film and the reflection-type polarizing film.

Further, a light absorption film may be disposed on the side of the reflection-type polarizing film, opposite from the visible side thereof. Further, a light scattering film may be disposed on the visible side of the absorption-type polarizing film. Further, a backlight may be disposed on the side of the reflection-type polarizing film, opposite from the visible side thereof. In the latter case, a translucent film may be disposed between the reflection-type polarizing film and the backlight. An absorption-type polarizing film may be used as the translucent film.

In the liquid crystal display panel having the backlight disposed therein, a light scattering film may be disposed on the visible side of the absorption-type polarizing film.

In the aforementioned liquid crystal display panels, the absorption-type polarizing film is, preferably, disposed on the visible side of the liquid crystal cell such that the transmission axis of the absorption-type polarizing film is parallel with the direction of the long axes of liquid crystal molecules located on the visible side of the liquid crystal layer in the liquid crystal cell, while the reflection-type polarizing film is, preferably, disposed such that the transmission axis thereof is parallel with, or orthogonal to the direction of the long axes of liquid crystal molecules located on the side opposite from the visible side of the liquid crystal layer in the liquid crystal cell.

Alternatively, the absorption-type polarizing film is disposed on the visible side of the liquid crystal cell such that the transmission axis of the absorption-type polarizing film may be orthogonal to the direction of the long axes of liquid crystal molecules located on the visible side of the liquid crystal layer in the liquid crystal cell while the reflection-type polarizing film is disposed such that the transmission axis thereof may be in parallel with, or orthogonal to the direction of the long axes of liquid crystal molecules located on the side opposite from the visible side of the liquid crystal layer in the liquid crystal cell.

(These conditions are particularly indicated when using a twisted nematic liquid crystal layer having a twist angle of 90°)

As the color filter of the aforementioned liquid crystal display panel, it is preferable to use the following:

1) a selective transmission color filter for transmitting a light component substantially at a specified wavelength only;

2) a color polarizing film capable of transmitting a component of the light linearly polarized in the direction orthogonal to the transmission axis thereof, at a specified wavelength only, and absorbing light components of the linearly polarized at other wavelengths while transmitting all components of the light linearly polarized light in the direction parallel with the transmission axis thereof;

3) a dielectric multi layer film capable of reflecting a light component of incoming light having a specified wavelength, while transmitting light components of the incoming light at other wavelengths.

The liquid crystal layer of said liquid crystal cell may be composed of any from among a twisted nematic liquid crystal layer, a supertwisted nematic liquid crystal layer, and a guest host liquid crystal layer.

The color filter of the liquid crystal display panel may be disposed between the absorption-type polarizing film and the liquid crystal cell or may be disposed between the liquid crystal cell and the reflection-type polarizing film. Alternately, the color filter may be disposed between the transparent substrates making up the liquid crystal cell and the liquid crystal layer.

In the timepiece according to the invention, light falling on the liquid crystal display panel from the visible side thereof is turned to linearly polarized light by the absorption-type polarizing film, and the linearly polarized light is either twisted or not twisted when transmitted through the liquid crystal cell of the liquid crystal display panel, depending on whether a voltage is applied or not between the electrodes in parts of the liquid crystal cell through which the linearly polarized light is transmitted. If the light is linearly polarized in the direction parallel to the transmission axis of the reflection-type polarizing film upon reaching the reflection-type polarizing film, the linearly polarized light is transmitted through the reflection-type polarizing film. However, if the light is linearly polarized in the direction crossing the transmission axis of the reflection-type polarizing film at right angles upon reaching there, the linearly polarized light undergoes specular reflection by the reflection-type polarizing film, and is sent back to the visible side.

Further, since the color filter is disposed in the optical path of the linearly polarized light, the linearly polarized light is colored. Accordingly, parts where the linearly polarized light is reflected appear as a bright and colored display in a metallic tone or mirror-like tone, while parts where incoming light is transmitted through the reflection-type polarizing film are indicated in the color of the background of the parts (the colors of components inside the timepiece, or in black, white, or other optional colors in the case wherein the light absorption film, the translucent film, and so forth are installed). Accordingly, due to sharp contrast between these parts, time information and calendar information can be indicated in bright and colored display.

Thus, the invention can provide a digital timepiece having variation in design, or various timepieces using other liquid crystal displays.

Further, by disposing the light scattering film on the visible side of the absorption-type polarizing film of the liquid crystal display panel described above, light reflected through specular reflection by the reflection-type polarizing film is scattered, turning colored display of a metallic tone or mirror-like tone to a more delicate tone of color so as to be seen with more ease while widening a viewing angle as well.

If the backlight is installed on the side of the reflection-type polarizing film opposite from the visible side, a half of light falling on the reflection-type polarizing film when the backlight is lit up is transmitted therethrough even in a dark environment such as at night, and is turned to linearly polarized light to fall on the liquid crystal cell. There will be created parts where the linearly polarized light is twisted and parts where the linearly polarized light is not twisted depending on whether a voltage is applied between the electrodes of the liquid crystal cell or not, and as a result, time information and calendar information can be indicated distinctly in color display by a difference in brightness between parts where the linearly polarized light is transmitted through the absorption-type polarizing film and parts where the light linearly polarized is absorbed by the absorption-type polarizing film, and by coloring of the linearly polarized light by the agency of the color filter.

BEST MODE FOR CARRYING OUT THE INVENTION

A best mode for carrying out the invention will be now described with reference to the attached drawings.

Watch Embodying the Invention

Figure 1:
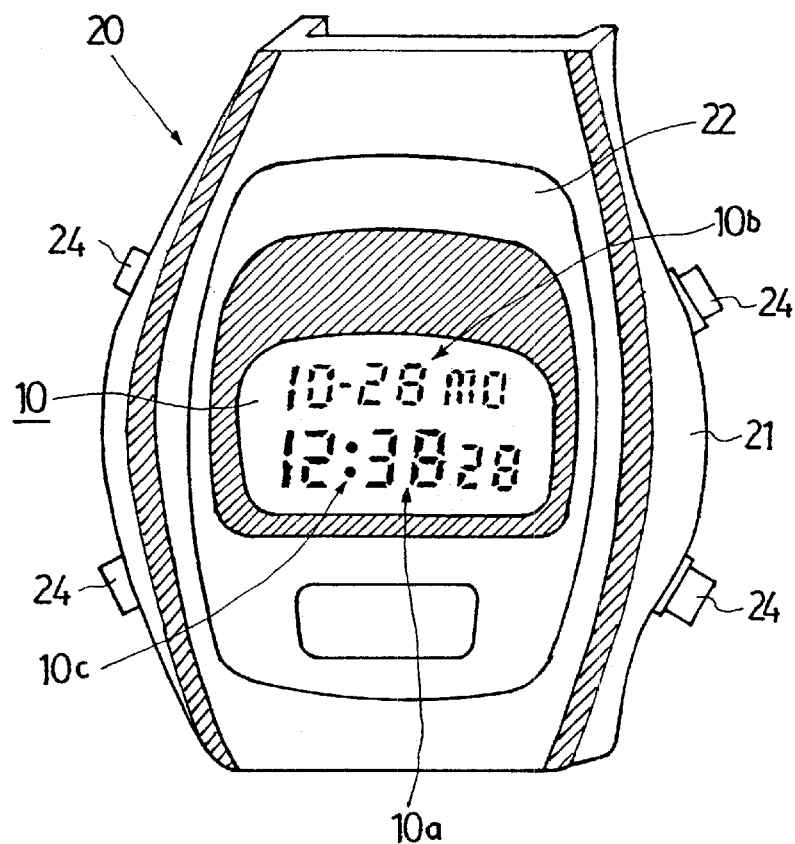
FIG. 1 is a perspective view of a digital indicating type watch, showing the external view thereof, and FIG. 2 a sectional view of the same watch, showing the internal construction thereof.
Figure 2:
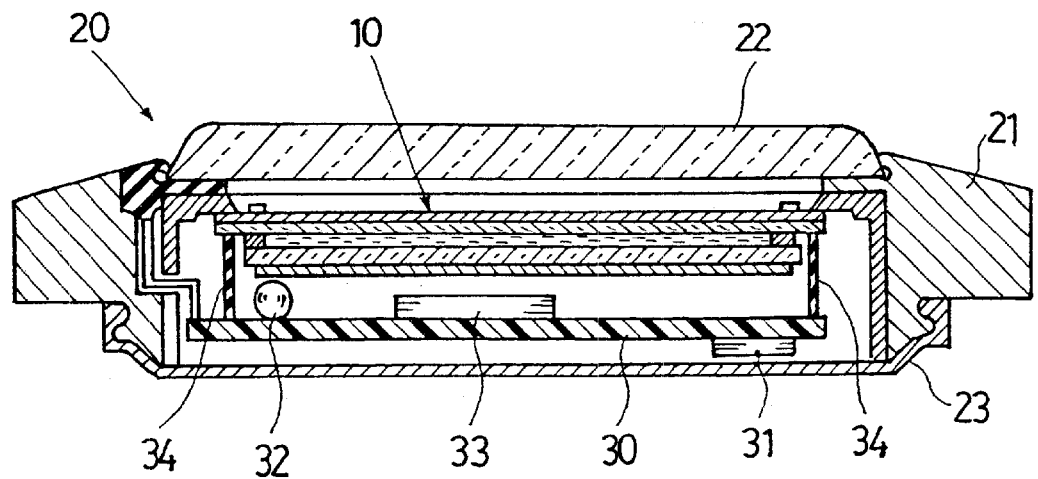

FIG. 1 is a perspective view of a digital indicating type watch, showing the external view thereof, and FIG. 2 a sectional view of the same watch, showing the internal construction thereof.

A case 20 of the quartz watch is made up of a glass plate 22 and a case back cover 23, integrally joined with a case body 21 made of metal.

The glass plate 22 is made of a transparent material such as sapphire glass, tempered glass, or plastics, and integrally joined with the front face of the case body 21 by means of direct bonding, or fitting therein via a packing. The case back cover 23 is integrally joined with the back face of the case body 21 by means of screwing therein or fitting therein via a packing.

Thus, the case 20 has an airtight inner structure so as not to allow ingress of dust or moisture therein.

A liquid crystal display panel (liquid crystal display device) 10 to serve as a display for indicating time and so forth is installed on the side of the glass plate 22 inside the case 20.

The liquid crystal display panel 10 comprises a time display section 10a for displaying hour, minute, and second, a calendar display section 10b for displaying month, date, days of the week, and a colon mark display section 10c for blinking every second.

Further, the liquid crystal display panel 10 is capable of displaying a function of time display for 12 consecutive hours or 24 consecutive hours, of displaying a function of calendar display for month, date and days of the week, an alarm function, a stopwatch function, a timer function, and so forth.

Changeover among such various functions, and correction of time are executed by manipulating a plurality of switching buttons 24 installed in the side of the case body 21 of the case 20. A packing is provided between each of the switching buttons 24 and the case body 21 so as not to allow ingress of dust and moisture into the case 20.

As shown in FIG. 2, the quartz watch has an inner structure such that the liquid crystal display panel 10 and a printed circuit board 30 are disposed substantially in parallel with each other inside the case 20, and a battery 31 for serving as a driving power source of the printed circuit board 30 is installed on the case back cover 23 side of the printed circuit board 30.

A semiconductor integrated circuit 33 comprising a crystal oscillator 32 having an oscillation frequency of 32,768 Hz, a crystal oscillation circuit for generating a predetermined signal by oscillating the crystal oscillator 32, a counting down circuit, a driving circuit for driving the liquid crystal display panel 10, a central processing unit (CPU) for overall control of the quartz watch, and so forth is mounted on the printed circuit board 30.

The liquid crystal display panel 10 is electrically connected with the printed circuit board 30 via a zebra rubber connector 34 disposed therebetween. The zebra rubber connector 34 is disposed so as to be compressed thicknesswise in order to ensure electrical connection between the liquid crystal display panel 10 and the printed circuit board 30.

The zebra rubber connector 34 is made up of electrically conductive layers, composed of insulating silicone rubber with carbon and metal particles contained therein, and formed at a predetermined pitch, and electrically conductive in the direction of thickness thereof via the respective electrically conductive layers, but in a transversely insulated condition between adjacent electrically conductive layers.

A connection terminal pattern is formed on the faces of the liquid crystal display panel 10 and the printed circuit board 30, opposite to each other, respectively, in such a fashion as to correspond to vertically conductive parts of the zebra rubber connector 34, formed of the electrically conductive layer, respectively, and insulation parts of the zebra rubber connector 34, alternately disposed, and in dimensions at the same pitch as that for the vertically conductive parts.

The construction of the liquid crystal display panel 10 is described hereinafter in detail. In FIGS. 3–22, the visible side of the liquid crystal cell is shown as the top side.

First Embodiment of Liquid Crystal Display Panel

First, a first embodiment of a liquid crystal display panel 10 used in the time piece according to the invention set forth above is described with reference to FIGS. 3 to 11. These figures exaggerate the thickness of and spacing between respective components.

Figure 3:
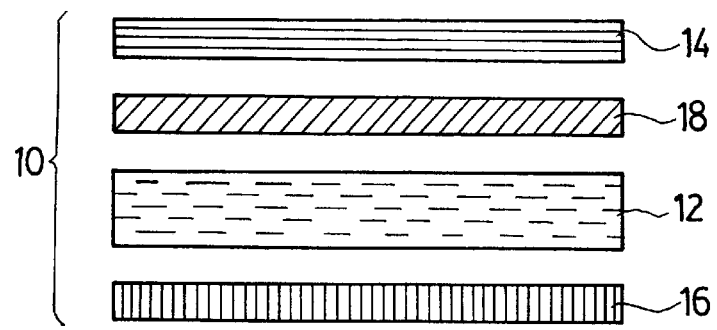
FIG. 3 is a first schematic sectional view illustrating the construction of the liquid crystal display panel used in a timepiece according to the invention.
Figure 6:
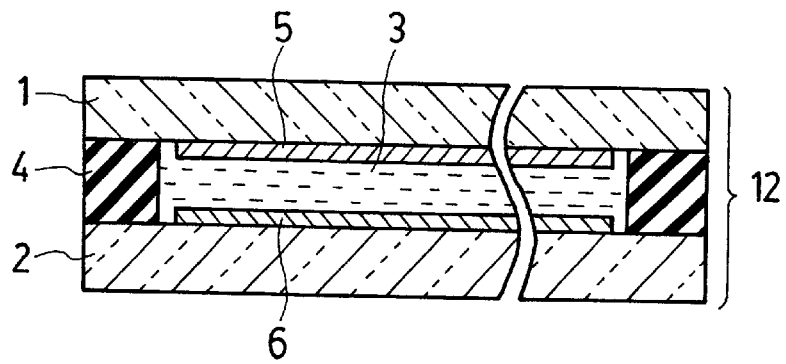
FIG. 6 is a schematic sectional view of a liquid crystal cell incorporated therein showing a fragmentary mid-sectional view.

FIG. 3 is a schematic sectional view illustrating the construction of the liquid crystal display panel 10, and FIG. 6 is a schematic sectional view of a liquid crystal cell 12 incorporated therein, in which a mid-portion is cutaway.

As shown in FIG. 3, the liquid crystal display panel 10 is made up of the liquid crystal cell 12, an absorption-type polarizing film 14 disposed on the visible side (the upper side in the figure) of the liquid crystal cell 12, a reflection-type polarizing film 16 disposed on the side opposite from the visible side (the underside in the figure) of the liquid crystal cell 12 and a color filter 18 disposed between the absorption-type polarizing film 14 and the liquid crystal cell 12.

As shown in FIG. 6, the liquid crystal cell 12 is made up by adhering together a pair of substrates 1, 2, made of transparent insulating material such as glass, with a sealant 4 disposed on the periphery thereof, so as to seal a liquid crystal layer 3 in a gap formed between the pair of the substrates to be interposed therebetween. Transparent electrodes 5, 6, made of indium tin oxide (ITO) and so forth, are formed on the inner faces of the pair of the substrates 1, 2, facing each other, respectively, and at least one of the electrodes is formed in such a pattern as is required for displaying time information and calendar information (for displaying numbers, generally, in the seven-segment display pattern).

The liquid crystal layer 3 is composed of twisted nematic (TN) liquid crystals having a twist angle of 90 degrees, and alignment treatment is applied to the surface of the respective substrates 1, 2 and the respective electrodes 5, 6, on the side in contact with the liquid crystal layer 3, such that liquid crystal molecules are aligned in predetermined directions.

The absorption-type polarizing film 14 disposed on the visible side of the liquid crystal cell 12 is a sheet-shaped member for transmitting the light linearly polarized in the direction parallel with the transmission axis thereof, and absorbing the light linearly polarized in the direction orthogonal to the transmission axis thereof.

The reflection-type polarizing film 16 disposed on the side of the liquid crystal cell 12 opposite from the visible side is a sheet-shaped member for transmitting the light linearly polarized in the direction parallel with the transmission axis thereof, and reflecting the light linearly polarized in the direction orthogonal to the transmission axis thereof. As the reflection-type polarizing film 16, an optical film, for example, DBEF (trade name), manufactured by Sumitomo Three M Co., Ltd., is used.

The absorption-type polarizing film 14 is disposed such that the transmission axis thereof is parallel with the direction of the long axes of liquid crystal molecules located on the visible side of the liquid crystal layer 3 in the liquid crystal cell 12.

Also, the reflection-type polarizing film 16 is disposed such that the transmission axis thereof is parallel with the direction of the long axes of liquid crystal molecules located on the side opposite from the visible side of the liquid crystal layer 3 in the liquid crystal cell 12.

Consequently, the transmission axis of the absorption-type polarizing film 14 crosses that of the reflection-type polarizing film 16 at a right angle.

In FIG. 3, the direction of stripes on the absorption-type polarizing film 14 and that of stripes on the reflection-type polarizing film 16 indicate the direction of the respective transmission axes, lateral stripes on the absorption-type polarizing film 14 indicating that the direction of the transmission axis thereof is parallel to the plane of the figure, while vertical stripes on the reflection-type polarizing film 16 indicating that the direction of the transmission axis thereof is perpendicular to the plane of the figure.

The color filter 18 disposed between the absorption-type polarizing film 14 and the liquid crystal cell 12 is a selective transmission color filter (also called an absorption-type filter) for transmitting a light component substantially at a specified wavelength only, and for absorbing light components at other wavelengths. Accordingly, light transmitted through this color filter is colored in a specified color.

For example, a pigment-dispersion coating, prepared by dispersing a pigment in an organic resin and blending both together, is used for the selective transmission color filter. As the pigment-dispersion coating can be formed by a coating method or a printing method, the same can be fabricated to a surface (for example, in FIG. 3, on the surface of the absorption-type polarizing film 14, opposite from the visible side, or in FIG. 6, on the outer surface of the substrate 1 disposed on the visible side of the liquid crystal cell 12) of one of the existing constituent members by means of the coating, without requiring any additional constituent member. Of light falling on the pigment-dispersion coating, a light component at a specified wavelength only is transmitted therethrough, and light components at other wavelengths are absorbed thereby.

Placement of the color filter 18 is not limited to the position shown in FIG. 3, and may be located anywhere on the visible side of the reflection-type polarizing film 16 which is composed of the liquid crystal display panel 10.

Figure 4:
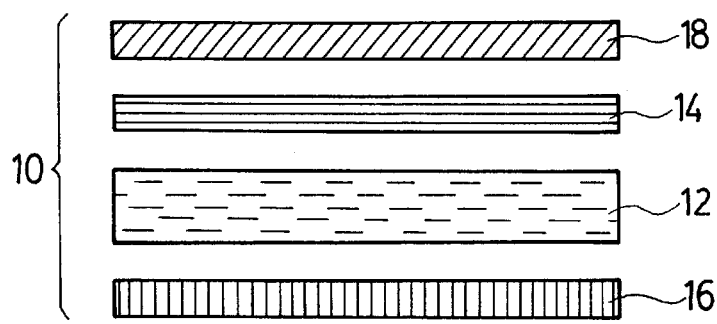
FIGS. 4 and 5 are schematic sectional views showing respective modified examples.
Figure 5:
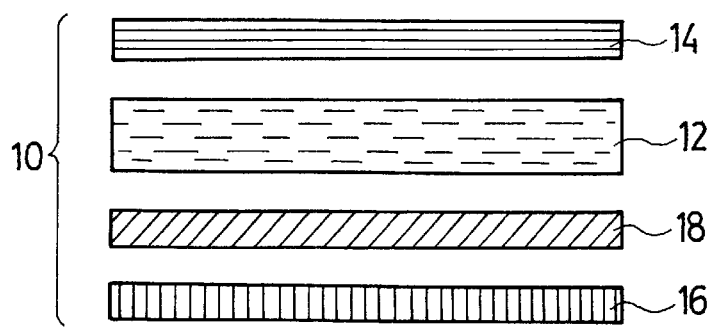

Accordingly, the color filter 18 may be disposed on the visible side (on the external side) of the absorption-type polarizing film 14 as shown in FIG. 4, or between the liquid crystal cell 12 and the reflection-type polarizing film 16 as shown in FIG. 5.

Figure 7:
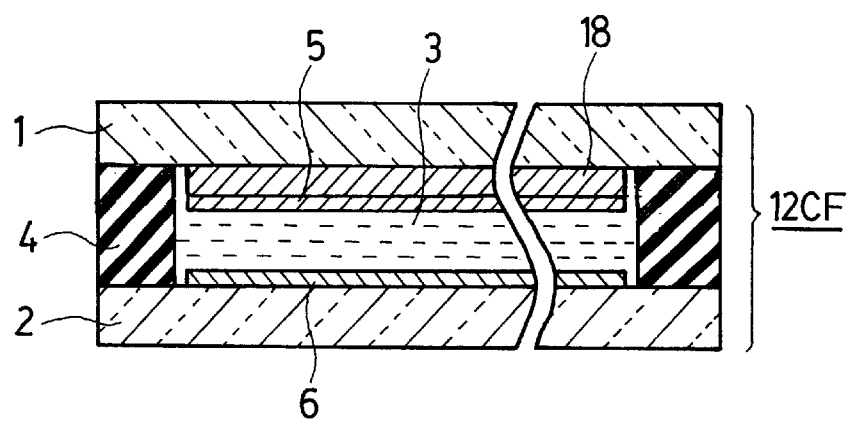
FIGS. 7 and 8 are sectional views showing respectively different examples of liquid crystal cells with a color filter incorporated therein and similar to FIG. 6.
Figure 8:
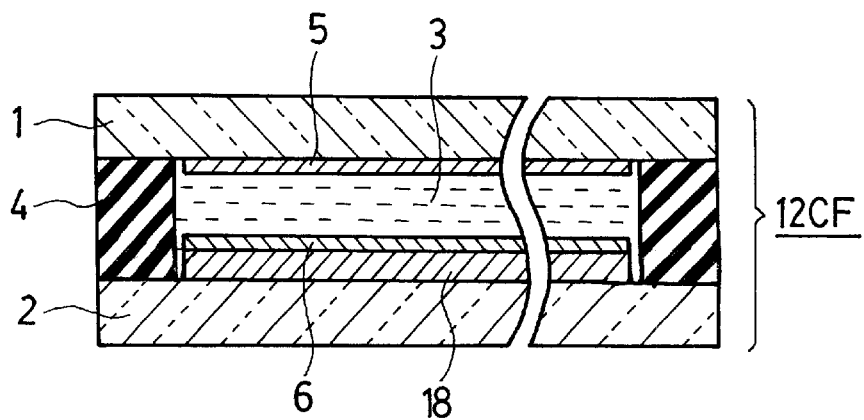
Figure 9:
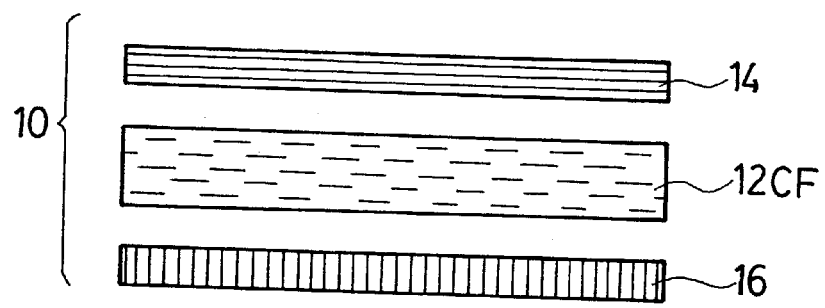
FIG. 9 is a schematic sectional view showing the construction of the liquid crystal display panel using the liquid crystal cell as shown in FIGS. 7 or 8.

Otherwise, a liquid crystal cell 12CF with a color filter incorporated therein may be substituted for the liquid crystal cell 12 as shown in FIG. 7 or FIG. 8, and then, the liquid crystal display panel 10 can be made up simply by disposing the absorption-type polarizing film 14 and the reflection-type polarizing film 16, on the opposite sides of the liquid crystal cell 12CF, with the color filter incorporated therein as shown in FIG. 9.

In such a case, the color filter 18 may be formed by applying the pigment-dispersion coating to the inner surface of the substrate 1 disposed on the visible side of the liquid crystal cell 12CF as shown in FIG. 7, or by applying the pigment-dispersion coating to the inner surface of the substrate 2 disposed on the side of the liquid crystal cell 12CF opposite from the visible side as shown in FIG. 8.

The transparent electrode 5 or 6 is formed on the surface of the color filter 18 thus formed, in contact with the liquid crystal layer 3, however, the color filter 18 may be formed instead on the entire surface of the substrate 1 with the electrode 5 formed thereon, in contact with the liquid crystal layer 3, or on the entire surface of the substrate 2 with the electrode 6 formed thereon, in contact with the liquid crystal layer 3.

Now, the principles of colored display by the liquid crystal display panel 10 shown in FIG. 3 are described with reference to FIGS. 10 and 11.

In these figures, the lateral stripes on the absorption-type polarizing film 14 and the vertical stripes on the reflection-type polarizing film 16 indicate the direction of the respective transmission axes either parallel to the plane of the figure, or perpendicular to the plane of the figure as described with reference to FIG. 3. Longer solid lines with an arrow at one end thereof indicate the direction of light rays, and shorter solid lines with an arrow at opposite ends thereof indicate the direction of the light linearly polarized after the light rays pass through respective constituent members; ones shown oriented sideways being in the direction parallel to the plane of the figure, and ones shown oriented vertically being in the direction perpendicular to the plane of the figure.

As described in the foregoing, the liquid crystal layer 3 of the liquid crystal cell 12 is composed of the twisted nematic (TN) liquid crystals having the twist angle of 90 degrees, and the color filter 18 is the selective transmission color filter capable of transmitting a light component in yellow only, and absorbing light components in colors other than yellow.

Figure 10:
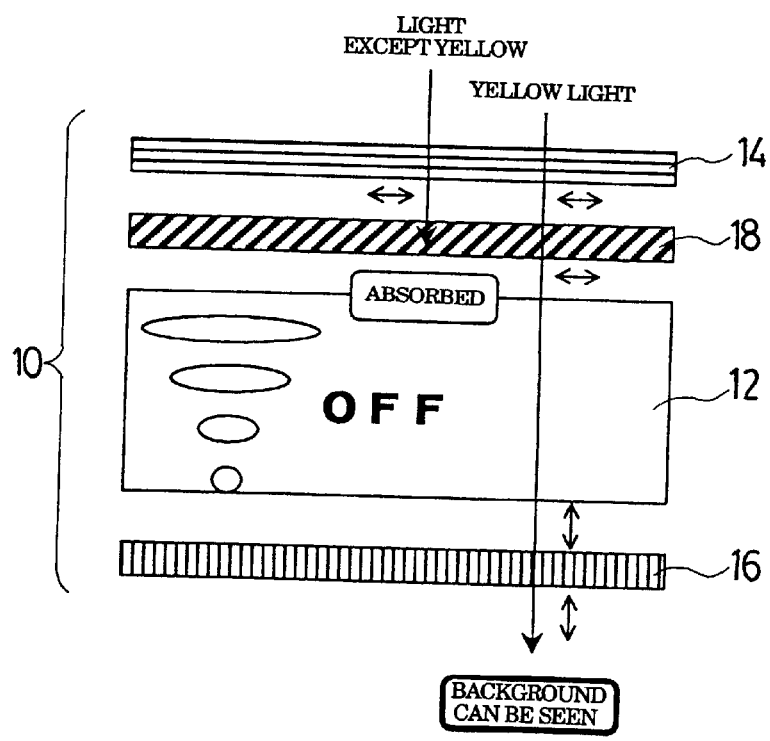
FIGS. 10 and 11 are views for explaining the principles of colored display by the liquid crystal display panel shown in FIG. 3.

FIG. 10 shows the background part when no voltage is applied between the electrodes 5 and 6 of the liquid crystal cell 12 (in an OFF state), where the direction of the light linearly polarized transmitted through the liquid crystal cell 12 is twisted by 90° (phase modulation) due to the twisting function of the liquid crystal layer 3 (FIG. 6).

Figure 11:
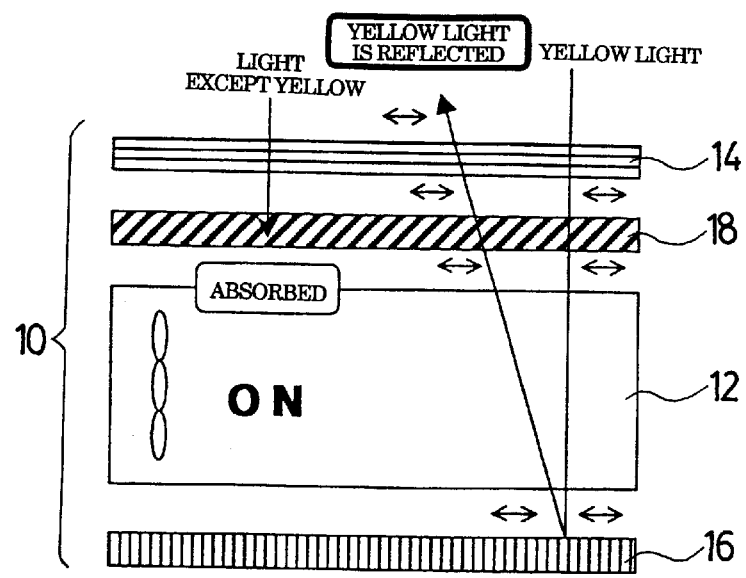

FIG. 11 shows display parts for characters and so forth when a voltage is applied between the electrodes 5 and 6 of the liquid crystal cell 12 (in an ON state), where incoming linearly polarized light is transmitted as it is through the liquid crystal cell 12 without the polarized direction thereof being twisted (phase modulation) as the liquid crystal layer 3 of the liquid crystal cell 12 loses the twisting function thereof with the liquid crystal molecules being set upright.

A half of light directed through the liquid crystal display panel 10 from the visible side (the upper side in the figure) is absorbed by the absorption-type polarizing film 14. The remaining half thereof is transmitted through the absorption-type polarizing film 14, and turned to the light linearly polarized in the direction parallel with the plane of the figure, falling then on the color filter 18.

Components of the linearly polarized light, in colors other than yellow, are all absorbed by the color filter 18 regardless of the ON/OFF condition of the liquid crystal cell 12. A component of the linearly polarized light, in yellow, is transmitted through the color filter 18, falling on the liquid crystal cell 12.

With the liquid crystal cell 12 in the OFF state as shown in FIG. 10, the linearly polarized light in yellow falls on the reflection-type polarizing film 16 after the direction thereof is twisted by 90°, and oriented in the direction perpendicular to the plane of the figure while transmitted through the liquid crystal cell 12. Since the linearly polarized light in yellow is in the same direction as that of the transmission axis of the reflection-type polarizing film 16, same is transmitted through the reflection-type polarizing film 16, so that the background can be seen in dark (the colors of components inside a timepiece in the case of the liquid crystal display panel 10 being installed in the timepiece) from the visible side.

On the other hand, with the liquid crystal cell 12 in the ON state as shown in FIG. 11, the linearly polarized light in yellow falls on the reflection-type polarizing film 16 with the polarized direction thereof remaining oriented in the direction parallel with the plane of the figure after being transmitted through the liquid crystal cell 12 without the direction thereof being twisted. Since the linearly polarized light in yellow has an oscillation direction oriented in the direction crossing the transmission axis of the reflection-type polarizing film 16 at a right angle, same undergoes specular reflection by the reflection-type polarizing film 16. As the reflected light of the linearly polarized light in yellow is sent back toward the visible side along the optical path in the direction reverse to that in which the linearly polarized light in yellow has come in, bright display in a yellow metallic tone can be indicated. Such display indicates a view in the same way as if a yellow color filter was placed on a mirror.

Accordingly, by applying a voltage between the electrodes of the liquid crystal cell 12 only in the display parts for characters for displaying time information and calendar information, bright display of characters can be indicated in a yellow metallic tone (similar to the color of gold) against the dark background, enabling the interior of a timepiece to be seen through.

Thus, with the timepiece according to the invention, substantially all light falling on the liquid crystal display panel 10, and colored, is reflected in regions for digitally displaying time information and calendar information, enabling bright and colored display to be indicated in a metallic tone.

On the other hand, in the background of the regions for digital display, light falling on the liquid crystal display panel 10 is transmitted through the reflection-type polarizing film 16, so that the side of the reflection-type polarizing film 16, opposite from the visible side, can be seen through. As a result, display as a whole indicates the digital display brought into relief in a colored and metallic tone.

Also, by disposing the reflection-type polarizing film 16 such that the transmission axis thereof crosses the direction of the long axes of the liquid crystal molecules on the side of the liquid crystal layer 3, opposite from the visible side, at a right angle, the transmission axis of the absorption-type polarizing film 14 is caused to be parallel with that of the reflection-type polarizing film 16, inversing the display condition described above by way of example, so that characters and so forth can be displayed in a fashion enabling the interior to be seen against the background in a yellow metallic tone.

If a color filter 18 capable of transmitting a light component in a different color is used, either the display parts or the background part can be indicated in display in the metallic tone of an optional color.

Accordingly, the invention can provide a timepiece having variation in design and offering some fun of use as well, in marked contrast to conventional timepieces for digitally displaying time information and calendar information in black against the background in white.

Also, for the liquid crystal display panel described above, a liquid crystal display panel of the dot matrix display mode may be adopted, or a liquid crystal display panel with patterns formed for a multitude of hands inclined at various angles, slightly shifted from each other, may be adopted, making up an analog timepiece display capable of indicating graphic display of simulated hands for the hour hand, the minute hand, the second hand, and the like.

Needless to say, it is also possible to indicate digital display of calendar information while indicating analog display of time information by simulated hands, or to indicate display of time information with addition of display for various other functions such as alarm, stopwatch, and so forth.

With any of the liquid crystal display panels wherein the color filter 18 is disposed in various positions as shown in FIGS. 4, 5, and FIGS. 7 to 9, respectively, the function of the respective liquid crystal display panels for colored display as described remains the same although a position where light falling on the liquid crystal display panel is colored by the color filter 18 is different in each case.

A case where the liquid crystal layer 3 sealed in the liquid crystal cell 12 is composed of the twisted nematic (TN) liquid crystals having a twist angle of 90° has been described in the foregoing by way of example, however, TN liquid crystals having a twist angle of less than 90°, supertwisted nematic (STN) liquid crystals having a twist angle in the range from 180° to 270°, or guest host liquid crystals and so forth may be used instead.

With the use of the supertwisted nematic liquid crystals, the transmission-voltage curve of the liquid crystal layer 3 can be made steeper, thereby increasing contrast.

When the liquid crystal layer 3 has a function of twisting the direction of linearly polarized light transmitted therethrough by the effect of phase modulation, the absorption-type polarizing film 14 and the reflection-type polarizing film 16, disposed on the opposite sides of the liquid crystal cell 12, are arranged such that the transmission axes of both the films in parallel with each other, or cross each other at an angle equal to the twist angle of the liquid crystal layer 3 (at right angles if the twist angle is 90°).

The guest host liquid crystals are mixed type liquid crystals made by dissolving a dichroic dye as solute into liquid crystals as solvent. If the alignment condition of the guest host liquid crystal molecules is changed by applying an electric field thereto, the alignment of the dichroic dye can be controlled following movement of the liquid crystal molecules, indicating display by modulating absorption of light incoming from a given direction.

By sealing the guest host liquid crystals in the liquid crystal cell 12 of the liquid crystal display panel 10, it is possible to show the regions for digitally displaying time information of a timepiece such as hour, minute, second, and so forth, and calendar information such as date, days of the week, month, year, and so forth, or the regions for analog display of simulated hands of a timepiece in a colored display condition in a metallic tone, and also to indicate colored display of the background part.

In this case, it is possible to create freely a combination of colors in which the regions for characters and the region for the background are displayed, respectively, by selecting the specified wavelength of a light component passing through the color filter 18, and the wavelengths of light components absorbed by the dichroic dye dissolved in the guest host liquid crystals, respectively.

A case where the selective transmission color filter is used for the color filter 18 has been described in the foregoing by way of example, however, a dielectric multi layer film may be used instead.

The dielectric multi layer film is made by laminating a plurality of dielectrics having different refractive indices, and which reflect a light component of incoming light at a specified wavelength while transmitting light components at other wavelengths.

Accordingly, if a color filter 18 made up of the dielectric multi layer film is disposed on the visible side of the absorption-type polarizing film 14, a light component of light falling on the liquid crystal display panel, at a specified wavelength only, is reflected by the color filter 18 made up of the dielectric multi layer film while light components at wavelengths other than the specified wavelength fall on the absorption-type polarizing film 14. Linearly polarized light having the polarized direction parallel with the transmission axis of the absorption-type polarizing film 14 then falls on the liquid crystal cell 12. In the background part behind the display parts, the linearly polarized light composed of the light components at wavelengths other than the specified wavelength undergoes phase modulation by 90° in the liquid crystal cell 12, and is also transmitted through the reflection-type polarizing film 16. On the other hand, in the display parts for characters and so forth, the linearly polarized light composed of the light components at wavelengths other than the specified wavelength is transmitted through the liquid crystal cell 12 without undergoing phase modulation as a voltage is applied between the electrodes of the liquid crystal cell 12, and undergoes specular reflection by the reflection-type polarizing film 16, being sent back to the visible side.

Therefore, in display regions for time information, calendar information, and so forth, substantially all incoming light components are reflected, indicating bright display in a metallic tone. Meanwhile, in the background part behind the display regions, the background is seen colored, as a light component at a specified wavelength only is reflected by the color filter 18 made up of the dielectric multi layer film, so that bright display in a metallic tone can be seen against the colored background.

With the use of the dielectric multi layer film, there will be little loss in the amount of light because of the makeup thereof. Also, it is possible to set freely the specified wavelength of a light component to be reflected by changing combinations of refractive indices of respective dielectric layers.

Further, a color polarizing film may be substituted for the color filter 18, and such an embodiment will be described in detail hereinafter.

Otherwise, a reflective color filter capable of transmitting a light component at a specified wavelength only, and reflecting light components at other wavelengths, a fluorescent filter having a function of converting the wavelength of incoming light, or so forth may be used instead.

Second Embodiment of Liquid Crystal Display Panel

Next, a second embodiment of a liquid crystal display panel used in the timepiece according to the invention is described with reference to FIG. 12.

Figure 12:
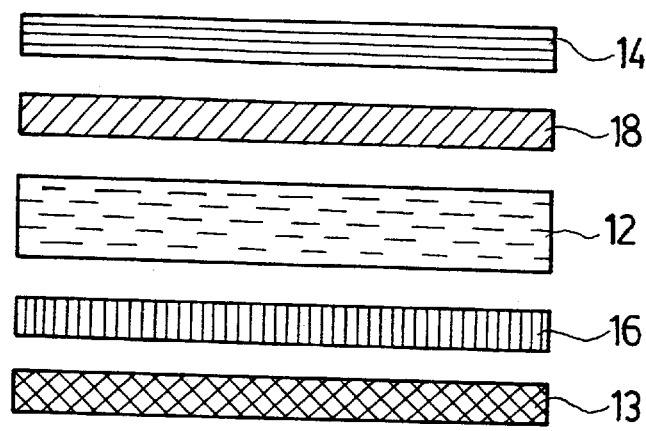
FIGS. 12 to 18 are schematic sectional views illustrating the second to eighth constructions of the liquid crystal display panel used in a timepiece according to the invention.

FIG. 12 is a schematic sectional view illustrating the construction of the liquid crystal display panel used in carrying out the invention. Parts corresponding to those previously described with reference to FIGS. 3 to 11 are denoted by the same reference numerals, and description thereof is omitted.

The construction of the liquid crystal display panel is the same as that shown in FIG. 3 except that a light absorption film 13 is disposed on the side (the underside in the figure) of the reflection-type polarizing film 16 opposite from the visible side. A light absorption film colored in black, an absorption-type polarizing film, an absorption-type color filter, or the like may be used for the light absorption film 13. In the case of using the absorption-type polarizing film, same is disposed such that the transmission axis thereof crosses that of the reflection-type polarizing film 16 at a right angle.

If the light absorption film 13 is disposed on the side of the reflection-type polarizing film 16, opposite from the visible side, light transmitted through the reflection-type polarizing film 16 can be absorbed by the light absorption film 13, so that the background part can be shown in a black or dark display condition for displaying time information, calendar information, and so forth, indicating clearly colored display of characters and so forth in a metallic tone against the background.

As a result, contrast in display is improved. When display is inversed, time information, calendar information, and so forth can be displayed with characters shown in black or in a color similar thereto in good contrast to the background shown in a bright and metallic tone.

In respect of other functions and application of various modifications, this embodiment is similar to the first embodiment, and therefore, description thereof is omitted.

Third Embodiment of Liquid Crystal Display Panel

Now, a third embodiment of a liquid crystal display panel used in the timepiece according to the invention is described with reference to FIG. 13.

Figure 13:
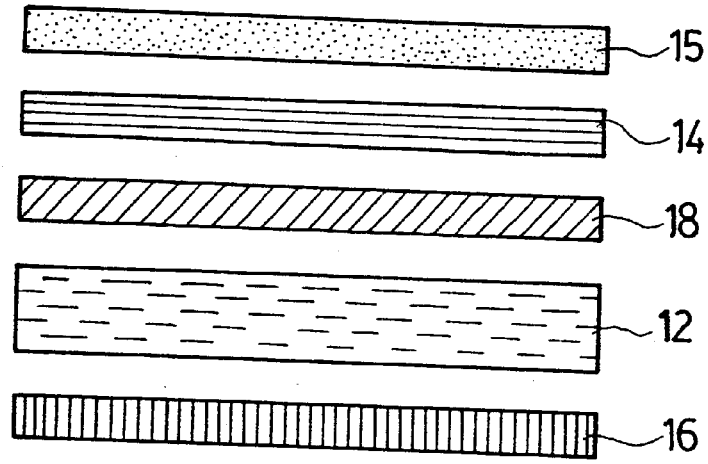

FIG. 13 is a schematic sectional view illustrating the construction of the liquid crystal display panel used in carrying out the invention. Parts corresponding to those previously described with reference to FIGS. 3 to 11 are denoted by the same reference numerals, and description thereof is omitted.

The construction of the liquid crystal display panel is the same as that shown in FIG. 3 except that a light scattering film 15 is disposed on the visible side (the upper side in the figure) of the absorption-type polarizing film 14.

The light scattering film 15 is formed by applying silica particles made of silicon dioxide, acrylic beads, or calcium powders that are mixed into an adhesive applied to a film-like substrate.

By installing the light scattering film 15 on the visible side of the absorption-type polarizing film 14, it is possible to cause light sent out to the visible side after specular reflection by the reflection-type polarizing film 16 to undergo irregular reflection by the agency of the light scattering film 15. As a result, a strong metallic tone in which colored display of time information and calendar information are indicated can be turned to a more delicate tone, allowing the display to be seen with more ease while widening a viewing angle as well.

A case where the light scattering film 15 is disposed on the visible side of the absorption-type polarizing film 14 is described in the foregoing by way of example, however, the light scattering film 15 may be disposed between the absorption-type polarizing film 14 and the liquid crystal cell 12, or between the liquid crystal cell 12 and the reflection-type polarizing film 16.

In respect of other functions and application of various modifications, this embodiment is similar to the first embodiment, and description thereof is therefore omitted.

Fourth Embodiment of Liquid Crystal Display Panel

Now, a fourth embodiment of a liquid crystal display panel used in the timepiece according to the invention is described with reference to FIG. 14.

Figure 14:
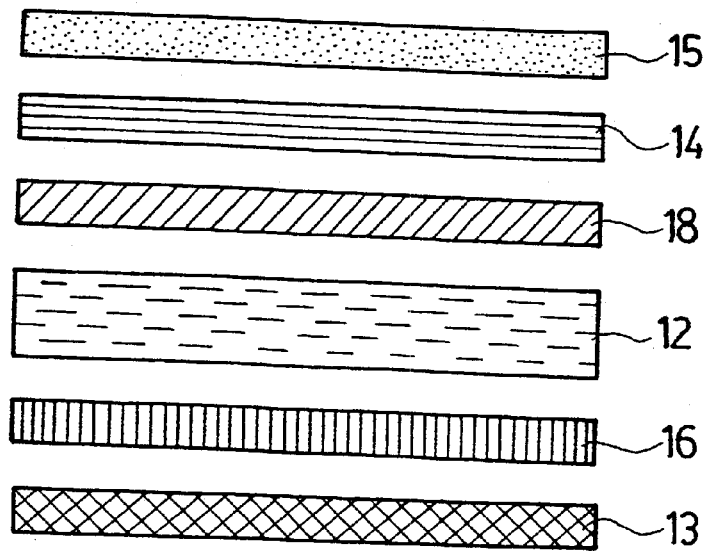

FIG. 14 is a schematic sectional view illustrating the construction of the liquid crystal display panel used in carrying out the invention. Parts corresponding to those previously described with reference to FIGS. 3 to 13 are denoted by the same reference numerals, and description thereof is omitted.

The construction of the liquid crystal display panel is the same as that shown in FIG. 3 except that a light absorption film 13 is disposed on the side of the reflection-type polarizing film 16, opposite from the visible side, and a light scattering film 15 is disposed on the visible side of the absorption-type polarizing film 14.

The liquid crystal display panel according to this embodiment has a construction wherein both the light absorption film 13 of the liquid crystal display panel shown in FIG. 12, and the light scattering film 15 of the liquid crystal display panel shown in FIG. 13 are installed, and consequently is able to have the operation and beneficial effects of both the films.

That is, with the use of the liquid crystal display panel, contrast between character parts thereof for displaying time information and calendar information and the background part can be enhanced, and a metallic tone in which colored display is indicated can be turned to a more delicate tone, allowing the display to be seen with more ease while widening a viewing angle as well.

In respect of other functions and application of various modifications, this embodiment is similar to the first embodiment, and description thereof is therefore omitted.

Fifth Embodiment of Liquid Crystal Display Panel

Now, a fifth embodiment of a liquid crystal display panel used in the timepiece according to the invention is described with reference to FIG. 15.

Figure 15:
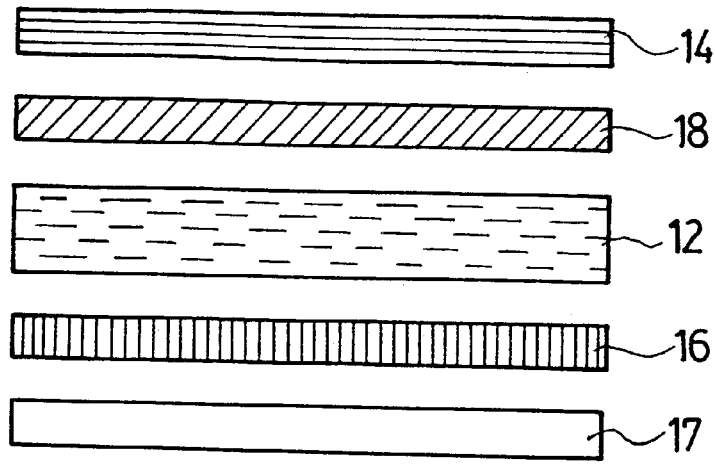

FIG. 15 is a schematic sectional view illustrating the construction of the liquid crystal display panel used in carrying out the invention. Parts corresponding to those previously described with reference to FIGS. 3 to 11 are denoted by the same reference numerals, and description thereof is omitted.

The construction of the liquid crystal display panel is the same as that shown in FIG. 3 except that a backlight 17 is disposed on the side (the underside in the figure) of the reflection-type polarizing film 16, opposite from the visible side.

An electroluminescence device, a light-emitting diode (LED) array, or a light source such as a cold cathode tube or a hot cathode tube is used for the backlight 17.

If the backlight 17 is disposed on the side of the reflection-type polarizing film 16 opposite from the visible side, a half of light emitted from the backlight 17 and falling on the reflection-type polarizing film 16 is transmitted therethrough, and turned to the linearly polarized light, falling on the liquid crystal cell 12. In the background part, the linearly polarized light undergoes phase modulation by 90° when passing through the liquid crystal cell 12, and colored by the color filter 18 transmitting a light component at a specified wavelength only, thereby being sent out to the visible side after being transmitted through the absorption-type polarizing film 14.

In character parts for displaying time information, calendar information, and so forth, the light linearly polarized turned from light emitted by the backlight, and falling on the liquid crystal cell 12 does not undergo phase modulation by the liquid crystal layer 3 as a voltage is applied between the electrodes of the liquid crystal cell 12, and has therefore the polarized direction orthogonal to the transmission axis of the absorption-type polarizing film 14, thus being absorbed by the absorption-type polarizing film 14.

Consequently, even at dark places where no or little external light is available, time information, calendar information, and so forth can be displayed in black or in a dark color against the bright background by the effect of colored light transmitted by lighting up the backlight 17.

The backlight 17 is lit up by manipulating as necessary any of the switches 24 of the timepiece, shown in FIG. 1.

When the backlight 17 is not lit up, display of time information, calendar information, and so forth continues to be indicated in a colored metallic tone.

In respect of other functions and application of various modifications, this embodiment is similar to the first embodiment, and description of these aspects is therefore omitted.

Sixth Embodiment of Liquid Crystal Display Panel

Now, a sixth embodiment of a liquid crystal display panel used in the timepiece according to the invention is described with reference to FIG. 16.

Figure 16:
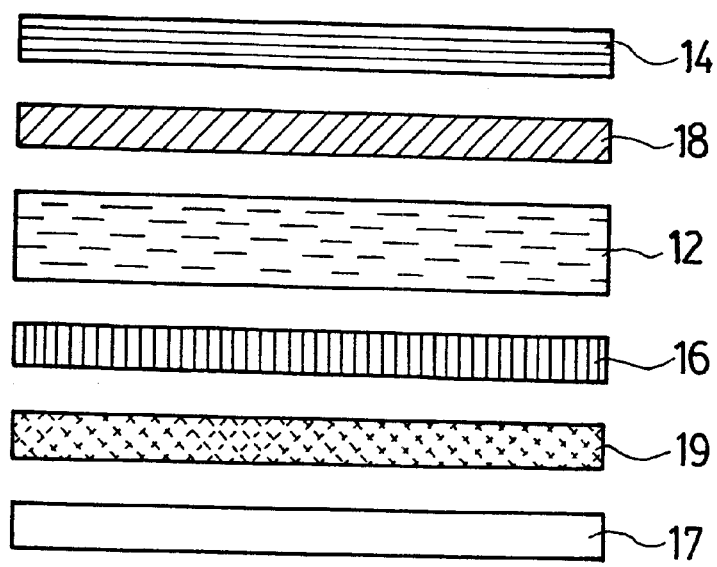

FIG. 16 is a schematic sectional view illustrating the construction of the liquid crystal display panel used in carrying out the invention. Parts corresponding to those previously described with reference to FIGS. 3 to 15 are denoted by the same reference numerals, and description thereof is omitted.

The construction of the liquid crystal display panel is the same as that shown in FIG. 15 except that a translucent film 19 is disposed between the reflection-type polarizing film 16 and the backlight 17.

In this embodiment of the invention, an absorption-type polarizing film is adopted for the translucent film 19, and disposed such that the transmission axis thereof intersects that of the reflection-type polarizing film 16 at an angle of 750.

If the translucent film 19 is disposed between the reflection-type polarizing film 16 and the backlight 17, a half of light transmitted through the reflection-type polarizing film 16 can be absorbed by the translucent film 19 when the backlight 17 is not lit up, thereby darkening the background part, so that contrast between display of time information, calendar information and so forth, and display of the background part can be enhanced.

On the other hand, when the backlight 17 is lit up at places where ambient external light is insufficient, the background part can be made brighter by light transmitted through the translucent film 19, and characters and so forth for displaying time information, calendar information, and so forth can be indicated in black and darker display.

Consequently, whether the backlight 17 is lit up or not, contrast of display can be enhanced.

In respect of other functions and application of various modifications, this embodiment is similar to the first embodiment and the fifth embodiment, and description of these aspects is therefore omitted.

Seventh Embodiment of Liquid Crystal Display Panel

Now, a seventh embodiment of a liquid crystal display panel used in the timepiece according to the invention is described with reference to FIG. 17.

Figure 17:
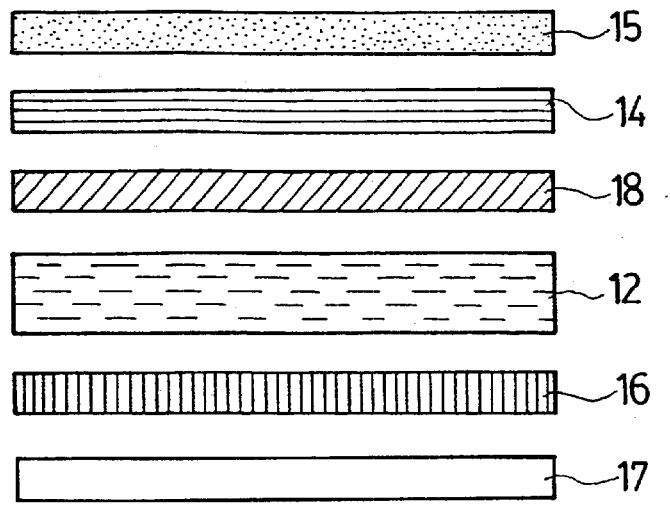

FIG. 17. is a schematic sectional view illustrating the construction of the liquid crystal display panel used in carrying out the invention. Parts corresponding to those previously described with reference to FIGS. 3 to 15 are denoted by the same reference numerals, and description thereof is omitted.

The construction of the liquid crystal display panel is the same as that shown in FIG. 15 except that a light scattering film 15 is disposed on the visible side of the absorption-type polarizing film 14.

By installing the light scattering film 15 on the visible side of the absorption-type polarizing film 14, it is possible to cause light outgoing to the visible side after specular reflection by the absorption-type polarizing film 14 to undergo irregular reflection by the agency of the light scattering film 15. As a result, a colored metallic tone in which characters and so forth expressing time information and calendar information are displayed can be turned to a more delicate tone, causing the display to be seen with more ease while widening a viewing angle as well.

In respect of other functions and application of various modifications, this embodiment is similar to the first embodiment, and the fifth embodiment, and description of these aspects is therefore omitted.

Eighth Embodiment of Liquid Crystal Display Panel

Now, an eighth embodiment of a liquid crystal display panel used in the timepiece according to the invention is described with reference to FIG. 18.

Figure 18:
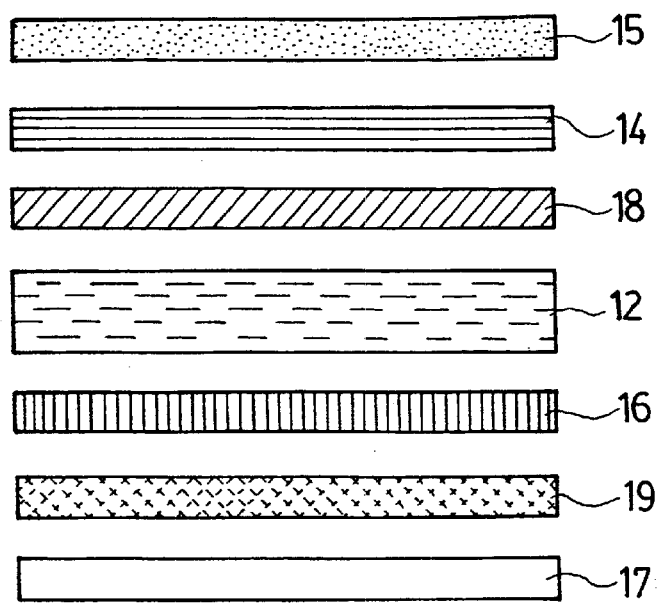

FIG. 18 is a schematic sectional view illustrating the construction of the liquid crystal display panel used in carrying out the invention. Parts corresponding to those previously described with reference to FIGS. 3 to 17 are denoted by the same reference numerals, and description thereof is omitted.

The construction of the liquid crystal display panel is the same as that shown in FIG. 16 except that a light scattering film 15 is disposed on the visible side of the absorption-type polarizing film 14.

By installing the light scattering film 15 on the visible side of the absorption-type polarizing film 14, it is possible to cause light outgoing to the visible side after specular reflection by the absorption-type polarizing film 14 to undergo irregular reflection by the agency of the light scattering film 15. As a result, a colored metallic tone in which characters and so forth expressing time information and calendar information are displayed can be turned to a more delicate tone, causing the display to be seen with more ease while widening a viewing angle as well.

In respect of other functions and application of various modifications, this embodiment is similar to the first embodiment, and the sixth embodiment, and description of these aspects is therefore omitted.

Ninth Embodiment of Liquid Crystal Display Panel

Now, a ninth embodiment of a liquid crystal display panel used in the timepiece according to the invention is described with reference to FIGS. 19 and 20.

Figure 19:
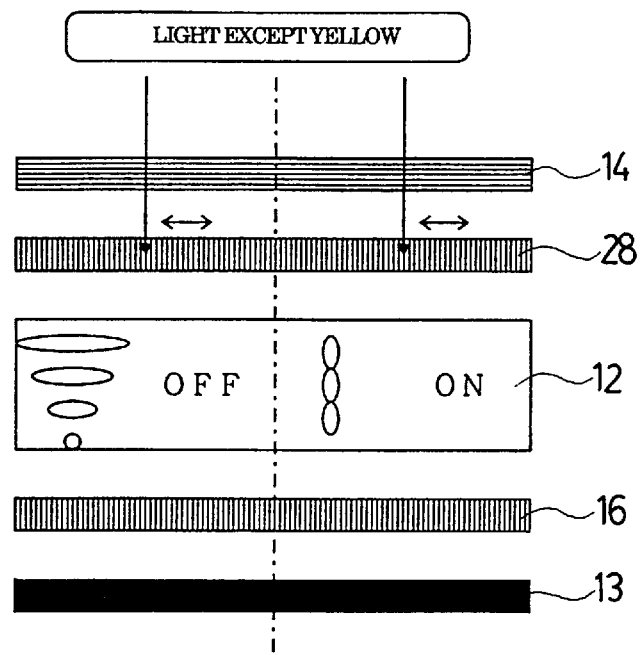
FIGS. 19 and 20 are views illustrating a ninth construction of the liquid crystal display panel and the principles of colored display thereby used in a timepiece according to the invention.
Figure 20:
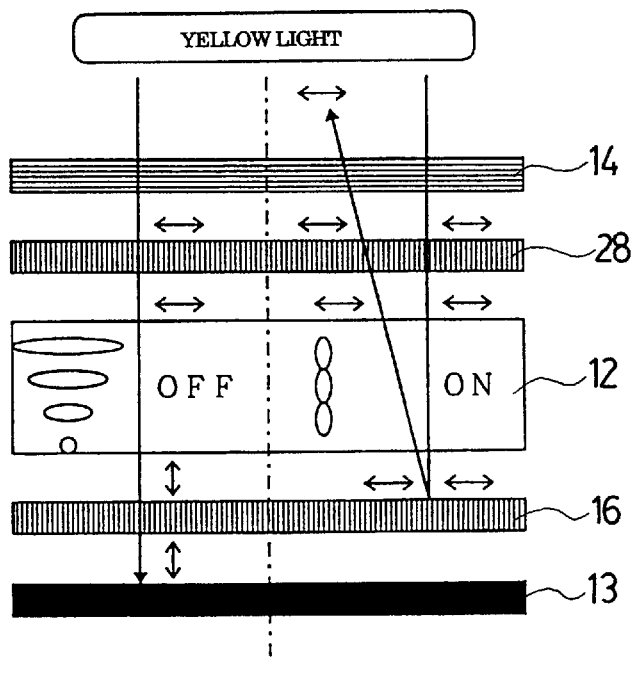

FIGS. 19 and 20 are schematic sectional views illustrating the construction of the liquid crystal display panel, and the principles of colored display thereby. Parts corresponding to those previously described with reference to FIGS. 3 to 12 are denoted by the same reference numerals, and description thereof is omitted. In FIGS. 19 and 20, the direction of stripes on respective polarizing films and significance of respective solid lines with an arrow or arrows are same as described with reference to FIGS. 10 and 11.

The construction of the liquid crystal display panel is the same as that shown in FIG. 12 except that a color polarizing film 28 serving as a color filter is disposed between the absorption-type polarizing film 14 and the liquid crystal cell 12 in place of the selective transmission color filter 18.

The color polarizing film 28 is capable of transmitting a light component of linearly polarized light in the direction orthogonal to the transmission axis of the color polarizing film 28, at a specified wavelength only, and absorbing light components of the linearly polarized light, at other wavelengths. However, the color polarizing film 28 has an optical property of transmitting both a light component of linearly polarized light in the direction parallel with the transmission axis thereof, at a specified wavelength, and light components of the linearly polarized light at other wavelengths.

In this case, the color polarizing film 28 is disposed such that the transmission axis thereof crosses that of the absorption-type polarizing film 14 at a right angle.

In this embodiment of the invention, the absorption-type polarizing film 14, the color polarizing film 28, and the liquid crystal cell 12 are disposed in this order.

Accordingly, since light transmitted through the absorption-type polarizing film 14 is the light linearly polarized in the direction orthogonal to the transmission axis of the color polarizing film 28, a light component thereof, at a specified wavelength only, is transmitted through the color polarizing film 28. However, light components of the linearly polarized light transmitted through the absorption-type polarizing film 14 at other wavelengths are absorbed by the color polarizing film 28. In the case of the example shown in the figures, the specified wavelength is that of a light component in yellow.

FIG. 19 shows the optical path of light components falling from the visible side onto the liquid crystal display panel, other than the light component in yellow, and FIG. 20 shows the optical path of the light component in yellow. The left half part of the figures indicates an OFF condition where no voltage is applied between the electrodes of the liquid crystal cell 12, and the right half part thereof indicates an ON condition where a voltage is applied between the electrodes of the liquid crystal cell 12.

As shown in FIG. 19, the light components falling from the visible side onto the liquid crystal display panel, other than the light component in yellow, are transmitted through the absorption-type polarizing film 14 and turned to linearly polarized light in the direction parallel with the transmission axis of the absorption-type polarizing film 14 (parallel with the plane of the figure), then falling on the color polarizing film 28. Since the direction of the oscillation plane thereof crosses the transmission axis of the color polarizing film 28 at a right angle, all the light components described above are absorbed by the color polarizing film 28, thus making no contribution to display regardless of whether the liquid crystal cell 12 is in the ON condition or the OFF condition.

As shown in FIG. 20, the light component in yellow falling from the visible side onto the liquid crystal display panel is transmitted through the absorption-type polarizing film 14 and turned to linearly polarized light in the direction parallel with the transmission axis of the absorption-type polarizing film 14, then falls on the color polarizing film 28 as with the case of the light components other than the light component in yellow. However, although the direction of polarization thereof is orthogonal to the transmission axis of the color polarizing film 28, linearly polarized light in yellow can be transmitted through the color polarizing film 28, and falls unaltered on the liquid crystal cell 12.

In the background part where the liquid crystal cell 12 is in the OFF condition, the linearly polarized light in yellow falling on the liquid crystal cell 12 undergoes phase modulation by 90° when transmitted through the liquid crystal cell 12, and the direction of the polarization thereof is caused to turn parallel with (perpendicular to the plane of the figure) the transmission axis of the reflection-type polarizing film 16. As a result, the linearly polarized light in yellow is transmitted through the reflection-type polarizing film 16, and absorbed by the light absorption film 13 disposed behind the reflection-type polarizing film 16. From the visible side, therefore, display is seen in a black or darker tone.

On the other hand, in display parts for characters and so forth, where the liquid crystal cell 12 is in the ON condition, the linearly polarized light in yellow falling unaltered on the liquid crystal cell 12 is transmitted therethrough, without undergoing phase modulation, and falls on the reflection-type polarizing film 16. Consequently, the linearly polarized light in yellow in the direction orthogonal to the transmission axis of the reflection-type polarizing film 16 undergoes specular reflection by the reflection-type polarizing film 16, outgoing to the visible side along the optical path thereof in the reverse direction.

It follows that in regions for characters and so forth for displaying time information, calendar information, and so forth, substantially all the light component in yellow, falling on the liquid crystal cell 12, is reflected, indicating bright display in a colored (yellow) and metallic tone against the background part in a black or darker tone.

Consequently, in marked contrast to conventional timepieces for digitally displaying time information and calendar information in black against the background in white, a timepiece using the liquid crystal display panel will have variation in design, and be a lot of fun to use. Furthermore, by selecting a specified wavelength (that is, a color) of a light component to be transmitted through the color polarizing film 28, display in a metallic tone can be executed in various colors.

Tenth Embodiment of Liquid Crystal Display Panel

Now, a tenth embodiment of a liquid crystal display panel used in the timepiece according to the invention is described with reference to FIGS. 21 and 22.

Figure 21:
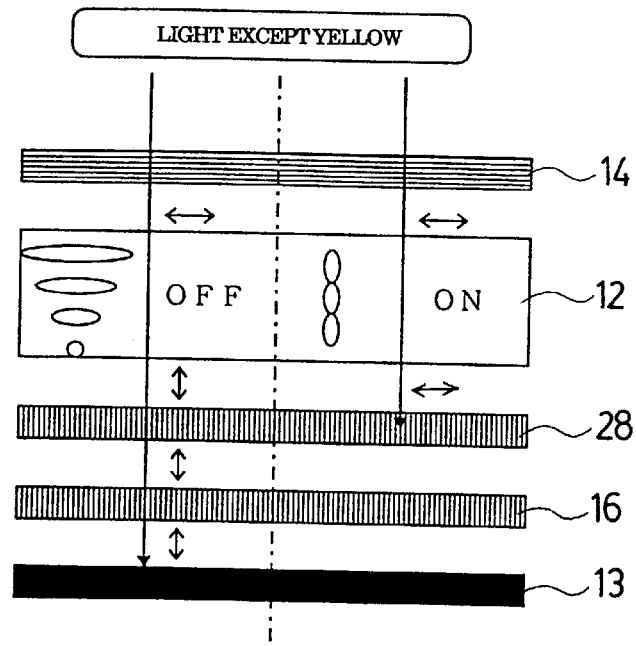
FIGS. 21 and 22 are schematic sectional views illustrating a tenth construction of the liquid crystal display panel used in a timepiece according to the invention and the principles of colored display thereby.
Figure 22:
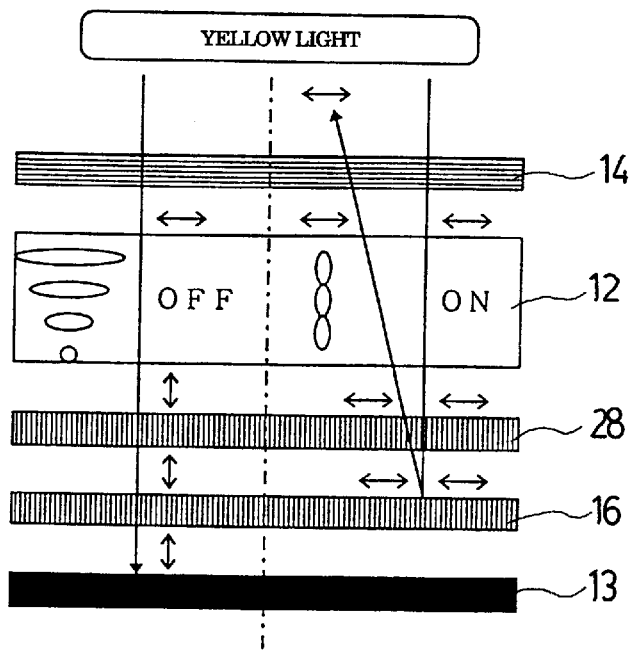

FIGS. 21 and 22 are schematic sectional views illustrating the construction of the liquid crystal display panel and the principles of colored display thereby. Parts corresponding to those previously described with reference to FIGS. 3 to 12 are denoted by the same reference numerals, and description thereof is omitted. In FIGS. 21 and 22, the direction of stripes on respective polarizing films and significance of respective solid lines with an arrow or arrows are same as described with reference to FIGS. 10 and 11.

The construction of the liquid crystal diysplay panel is the same as that shown in FIGS. 19 and 20 except that a color polarizing film 28 serving as a color filter is disposed between the liquid crystal cell 12 and the reflection-type polarizing film 16.

The color polarizing film 28 according to this embodiment as well is capable of transmitting a component of linearly polarized light in the direction orthogonal to the transmission axis thereof, at a specified wavelength (in yellow, in this case) only, and absorbing light components of the linearly polarized light at other wavelengths (in colors other than yellow).

As shown in FIGS. 21 and 22, all light components falling from the visible side onto the liquid crystal display panel are transmitted through the absorption-type polarizing film 14, and turned to linearly polarized light in the direction parallel with the transmission axis of the absorption-type polarizing film 14 (parallel with the plane of the figure), then falling on the liquid crystal cell 12. The linearly polarized light undergoes phase modulation by 90° in the left half part of the figures, where the liquid crystal cell 12 is in an OFF state, when transmitted through the liquid crystal cell 12, and turned to linearly polarized light in the direction parallel with the transmission axis of the color polarizing film 28, falling then on the color polarizing film 28.

Accordingly, in the background part where the liquid crystal cell 12 is in the OFF state, both the light component in yellow and the light components in colors other than yellow are transmitted through the color polarizing film 28 as well as the reflection-type polarizing film 16 disposed such that the transmission axis thereof is parallel with that of the color polarizing film 28, and are absorbed by the light absorption film 13 as shown in FIGS. 21 and 22.

In display regions for characters and so forth, where the liquid crystal cell 12 is in an ON state, the light components in colors other than yellow are absorbed by the color polarizing film 28 as shown in FIG. 21. However, the light component in yellow is transmitted through the color polarizing film 28, and falls on the reflection-type polarizing film 16, whereupon the light component in yellow undergoes mirror reflection, by the reflection-type polarizing film 16 because the direction of linear polarization thereof crosses the transmission axis of the reflection-type polarizing film 16 at a right angle, outgoing to the visible side along the optical path thereof in the reverse direction. Consequently, substantially all the colored light component after falling on the liquid crystal cell 12 will be reflected, outgoing to the visible side.

It follows therefore that with the use of the liquid crystal display panel according to this embodiment as well, bright display of time information, calendar information, and so forth can be indicated in a colored (yellow) and metallic tone against the background seen in a black or darker tone.

Consequently, in marked contrast to conventional timepieces for digitally displaying time information and calendar information in black against the background in white, a timepiece using the liquid crystal display panel will have variation in design, and be a lot of fun to use.

Furthermore, by selecting a specified wavelength (that is, a color) of a light component to be transmitted through the color polarizing film 28, display in a metallic tone can be executed in various colors.

With the ninth and the tenth embodiment of the liquid crystal display panel according to the invention, as described in the foregoing, the color polarizing film 28 may be disposed on the visible side of the absorption-type polarizing film 14, or on the inner surface side of either of the electrodes inside the liquid crystal cell 12 as with the case of the color filter 18 described in connection with the first embodiment.

Furthermore, various alternatives to the color filter 18, as described in connection with the first embodiment, are also applicable to the ninth and the tenth embodiment of the liquid crystal display panel described above.

Industrial Applicability

As is evident from the foregoing description, with the timepiece according to the invention, display of time information and calendar information can be indicated in a bright relief in a colored metallic tone against a dark background, or conversely, the display can be indicated in a black or dark color against a background shown in a colored metallic tone, thus enabling suitable selection of a color in which the display is to be indicated.

Thus, in marked contrast to conventional timepieces for digitally displaying time information and calendar information in black against the background in white, the invention can provide the timepiece having colorful variation in design, and offering some fun of use.

Further, some of the liquid crystal display panels used in the timepiece according to the invention are applicable to a timepiece with a backlight, which can be put to use at dark places where little or no external light is available.

The scope of the invention is not limited to a timepiece for digitally displaying time information and calendar information by use of numbers and so forth, but includes a timepiece wherein a liquid crystal display panel of the dot-matrix display mode is adopted for the liquid crystal display panel described above, and an analog display timepiece capable of indicating graphic display of simulated hands for the hour hand, the minute hand, and the second hand, made up by forming patterns for a multitude of the hands of a timepiece, inclined at various angles, slightly shifted from each other.

Needless to say, the invention can also provide a timepiece for indicating digital display of calendar information while indicating analog display of time information by use of simulated hands, or a timepiece for displaying time information with various other functions such as alarm, stopwatch, and so forth, added thereto.

What is claimed is:

1. A timepiece comprising a liquid crystal display panel capable of displaying at least either of time information and calendar information, said liquid crystal display panel comprising:

a liquid crystal cell having a liquid crystal layer sealed in between a pair of transparent substrates thereof, having an electrode on each of the inner surfaces thereof, facing each other;

an absorption-type polarizing film disposed on a visible side of the liquid crystal cell, for transmitting light linearly polarized in a direction parallel with a transmission axis thereof and absorbing light linearly polarized in a direction orthogonal to the transmission axis thereof;

a reflection-type polarizing film disposed on a side of the liquid crystal cell, opposite from the visible side thereof, for transmitting light linearly polarized in a direction parallel with a transmission axis thereof and reflecting light linearly polarized in a direction orthogonal to the transmission axis thereof; and a color filter disposed on the visible side of the absorption-type polarizing film.

2. The timepiece according to claim 1, wherein said liquid crystal display panel further comprises a light absorption film disposed on the side of said reflection-type polarizing film, opposite from the visible side thereof.

3. The timepiece according to claim 1, wherein said liquid crystal display panel further comprises a light scattering film disposed on the visible side of said absorption-type polarizing film.

4. The timepiece according to claim 1, wherein said liquid crystal display panel further comprises a light scattering film disposed on the visible side of said absorption-type polarizing film, and a light absorption film disposed on the side of said reflection-type polarizing film, opposite from the visible side thereof.

5. The timepiece according to claim 1, wherein said liquid crystal display panel further comprises a backlight disposed on the side of said reflection-type polarizing film, opposite from the visible side thereof.

6. The timepiece according to claim 5, wherein said liquid crystal display panel further comprises a translucent film disposed between said reflection-type polarizing film and the backlight.

7. The timepiece according to claim 6, wherein the translucent film is an absorption-type polarizing film.

8. The timepiece according to claim 1, wherein said liquid crystal display panel further comprises a light scattering film disposed on the visible side of said absorption-type polarizing film, and a backlight disposed on the side of said reflection-type polarizing film, opposite from the visible side thereof.

9. The timepiece according to claim 8, wherein said liquid crystal display panel further comprises a translucent film disposed between said reflection-type polarizing film and the backlight.

10. The timepiece according to claim 9, wherein the translucent film is an absorption-type polarizing film.

11. A timepiece as in claim 1, wherein said absorption type polarizing film is disposed on the visible side of the liquid crystal cell such that the transmission axis of said absorption-type polarizing film is parallel with a direction of long axes of liquid crystal molecules located on the visible side of the liquid crystal layer in the liquid crystal cell while said reflection-type polarizing film is disposed such that the transmission axis thereof is parallel with, or orthogonal to a direction of long axes of liquid crystal molecules located on the side of the liquid crystal layer in said liquid crystal cell, opposite from the visible side thereof.

12. The timepiece as in claim 1, wherein said absorption-type polarizing film is disposed on the visible side of the liquid crystal cell such that the transmission axis of said absorption-type polarizing film is orthogonal to the direction of the long axes of liquid crystal molecules located on the visible side of the liquid crystal layer in the liquid crystal cell while said reflection-type polarizing film is disposed such that the transmission axis thereof is parallel with, or orthogonal to the direction of the long axes of liquid crystal molecules located on the side of the liquid crystal layer in said liquid crystal cell, opposite from the visible side thereof.

13. The timepiece as in claim 1, wherein said color filter of said liquid crystal display panel is a selective transmission color filter for transmitting a light component substantially at a specified wavelength only.

14. The timepiece as in claim 1, wherein said color filter of said liquid crystal display panel is a color polarizing film capable of transmitting a light component of the light linearly polarized in the direction orthogonal to the transmittable axis thereof and having a specified wavelength only, and absorbing light components of the light linearly polarized at other wavelengths while transmitting all light components of the light linearly polarized in the direction parallel with the transmission axis thereof.

15. The timepiece as in claim 1, wherein said color filter of said liquid crystal display panel is a multi-layered dielectric coating capable of reflecting a light component of incoming light, and having a specified wavelength, while transmission light components of the incoming light at other wavelengths.

16. The timepiece as in claim 1, wherein the liquid crystal layer of said liquid crystal cell is composed of any one from among twisted nematic liquid crystals, supertwisted nematic liquid crystals, and guest host liquid crystals.

17. The timepiece as in claim 1, wherein said color filter of said liquid crystal display panel is disposed between said absorption-type polarizing film and said liquid crystal cell.

18. The timepiece as in claim 1, wherein said color filter of said liquid crystal display panel is disposed between said liquid crystal cell and said reflection-type polarizing film.

19. The timepiece as in claim 1, wherein said color filter of said liquid crystal display panel is disposed between one of the transparent substrates making up said liquid crystal cell and the liquid crystal layer.

20. A timepiece comprising a liquid crystal display panel capable of displaying at least either of time information and calendar information, said liquid crystal display panel comprising:

a liquid crystal cell having a liquid crystal layer sealed in between a pair of transparent substrates thereof, having an electrode on each of the inner surfaces thereof, facing each other;

an absorption-type polarizing film disposed on a visible side of the liquid crystal cell, for transmitting light linearly polarized in a direction parallel with a transmission axis thereof and absorbing light linearly polarized in a direction orthogonal to the transmission axis thereof;

a reflection-type polarizing film disposed on a side of the liquid crystal cell, opposite from the visible side thereof, for transmitting light linearly polarized in a direction parallel with a transmission axis thereof and reflecting light linearly polarized in a direction orthogonal to the transmission axis thereof; and a color filter disposed between the absorption-type polarizing film and the reflection-type polarizing film.

* * * * *